(12) United States Patent  (10) Patent No.: US 7,900,891 B2
Gideon et al.  (45) Date of Patent: Mar. 8, 2011

(54) TOOLING FOR INSULATING AIRCRAFT STRINGERS AND METHOD

(75) Inventors: David E. Gideon, Seattle, WA (US); Jamie Langabeer, Everett, WA (US); Josh Montgomery, Seattle, WA (US)

(73) Assignee: The Boeing Company, Chicago, IL (US)

( * ) Notice: Subject to any disclaimer, the term of this patent is extended or adjusted under 35 U.S.C. 154(b) by 952 days.

(21) Appl. No.: 11/498,723

(22) Filed: Aug. 4, 2006

(65) Prior Publication Data

US 2008/0029645 A1  Feb. 7, 2008

(51) Int. Cl.
*B64C 1/40* (2006.01)
(52) U.S. Cl. .................. 254/134.3 R; 244/119
(58) Field of Classification Search ........... 254/134.3 R, 254/134.5, 134.7; 244/119, 123.1, 123.12, 244/123.14, 120; 52/404.1, 406.1, 406.2, 52/407.3, 309.14
See application file for complete search history.

(56) References Cited

U.S. PATENT DOCUMENTS

| | | | | |
|---|---|---|---|---|
| 3,005,620 | A * | 10/1961 | Trunnell | 254/134.3 R |
| 4,573,298 | A * | 3/1986 | Harkins | 52/404.3 |
| 4,811,540 | A * | 3/1989 | Kallies et al. | 244/123.3 |
| 5,953,875 | A * | 9/1999 | Harkins | 52/407.3 |
| 6,179,269 | B1 * | 1/2001 | Kobylinski | 254/134.3 R |
| 6,358,591 | B1 * | 3/2002 | Smith | 428/74 |
| 6,722,611 | B1 * | 4/2004 | Wu et al. | 244/126 |
| 7,040,575 | B2 * | 5/2006 | Struve et al. | 244/118.5 |
| 7,118,069 | B2 * | 10/2006 | Novak et al. | 244/119 |

OTHER PUBLICATIONS

Johns Manville, "Aerospace Insulations," Microlite® AA Preminum NR Blankets, Aircraft Acoustical and Thermal Insulation, available at <http://www.jm-oem.com/products/microliteaapremium.asp>, last visited Feb. 4, 2010.

* cited by examiner

*Primary Examiner* — Hadi Shakeri

(57) ABSTRACT

To an aircraft stringer, a strap is inserted lengthwise through a stringer of an aircraft fuselage, a first end of the strap is secured to a first end of a length of insulation, and the first end of the length of insulation is drawn into a first end of the stringer in response to pulling a second end of the strap.

8 Claims, 2 Drawing Sheets

TOOLING FOR INSULATING AIRCRAFT STRINGERS AND METHOD

FIELD OF THE INVENTION

The present invention generally relates to a system and method of installing insulation. More particularly, the present invention pertains to a device and system for installing acoustical and thermal insulation in stringers of an aircraft and a method of use.

BACKGROUND OF THE INVENTION

Insulation is typically provided in the interior of airframes, particularly between the outer skin and the internal passenger compartments of aircraft fuselages. The insulation provides a number of functions including regulation of temperature, reduction of engine noise, reduction of noise from outside air turbulence, and protection of mechanical and structural components within the airframe from moisture and temperature extremes that might tend to damage or corrode the components.

A disadvantage associated with the conventional application of insulation to airframes is that the insulation adds to the weight of the aircraft and thereby increases fuel consumption. In addition, conventionally applied insulation must be affixed or fastened to the skin or other airframe component in order to prevent shifting of the insulation during flight.

Accordingly, it is desirable to provide a method, device and system for insulating aircraft stringers that is capable of overcoming the disadvantages described herein at least to some extent.

SUMMARY OF THE INVENTION

The foregoing needs are met, to a great extent, by the present invention, wherein in some embodiments a device and system for insulating an aircraft stringer and a method of use is provided.

An embodiment of the present invention relates to a method of insulating a stringer. In this method, a strap is inserted lengthwise through a stringer of an aircraft fuselage, a first end of the strap is secured to a first end of a length of insulation, and the first end of the length of insulation is drawn into a first end of the stringer in response to pulling a second end of the strap.

Another embodiment of the present invention pertains to an apparatus for insulating a stringer. The apparatus includes a means for inserting a strap lengthwise through a stringer of an aircraft fuselage, means for securing a first end of the strap to a first end of a length of insulation, and means for drawing the first end of the length of insulation into a first end of the stringer in response to pulling a second end of the strap.

Yet another embodiment of the present invention relates to a system for insulating a stringer. The system includes a strap having a first end, a second end, and a strap length, the first end being configured to detachably secure a length of insulation, the second end being configured to facilitate drawing the strap length through an aircraft stringer, the strap length being at least as long as the aircraft stringer and an entry guide to facilitate insertion of the length of insulation in the aircraft stringer.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides, in some embodiments, a device, system, and method of introducing insulation into aircraft stringers. An airplane stringer is an longitudinal member in the fuselage, or a spanwise member in the wing, which transmits skin loads into the body frames or wing ribs. Aircraft stringers increase rigidity of the airframe and provide a structure to affix internal elements of an aircraft, such as the passenger cabin, to. Conventionally, these aircraft stringers are not insulated. This is possibly due to the fact that stringers are narrow and the length of individual stringers may approach that of the aircraft or its wings and is therefore difficult.

Unexpectedly, it has been found that insulating the aircraft stringers does reduce the transfer of sound and thermal loss between the passenger cabin and the airframe. In addition, by insulating the stringers, it has been found that an overall reduction in insulation may be realized while obtaining the same noise, vibration, and/or thermal attenuation. In this manner, the overall weight of the aircraft may be reduced which results in a corresponding reduction in fuel consumption.

Figure 1:
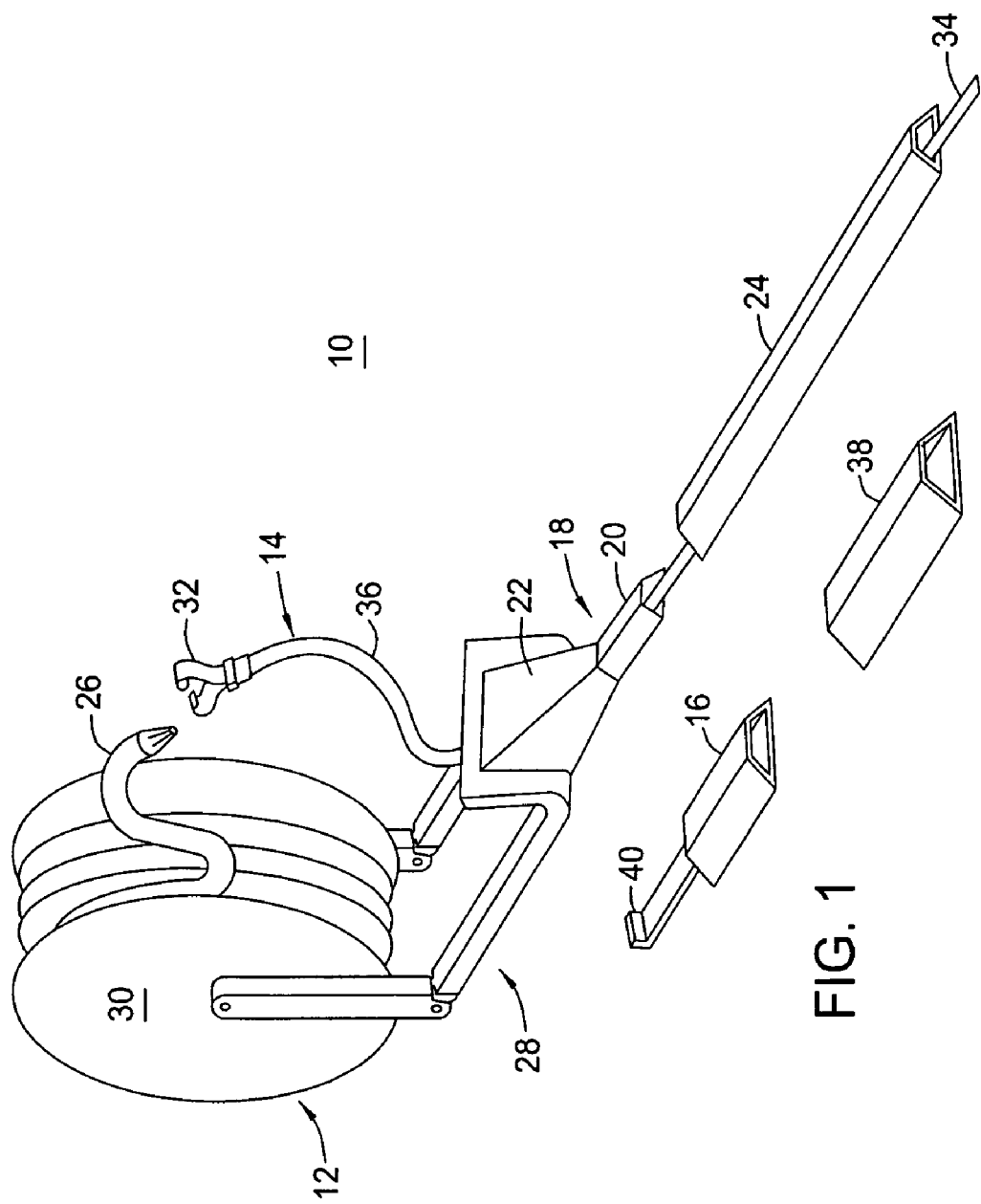
FIG. 1 is a simplified view of a system for insulating aircraft stringers according to an embodiment of the invention.

The invention will now be described with reference to the drawing figures, in which like reference numerals refer to like parts throughout. FIG. 1 is a simplified view of a stringer insulation system 10 for insulating aircraft stringers according to an embodiment of the invention. As shown in FIG. 1, the stringer insulation system 10 includes a stringer insulation device 12, strap 14, and an optional adapter 16.

The stringer insulation device 12 includes an entry guide 18 that includes a nose 20 and a taper 22. The nose 20 is configured to mate with a stringer 24. In various embodiments, the nose 20 may mate with the stringer 24 in any suitable manner. In a particular example, the nose 20 is configured to slide into an opening at one end of the stringer 24. The exterior dimensions of the nose 20 may be configured to essentially match the interior dimensions of the stringer 24 minus a sufficient amount to facilitate sliding the nose 20 into the stringer 24 without binding. In this manner, the nose 20 may detachably secure the stringer insulation device 12 to the stringer 24.

In a manufacturing facility, a variety of different sized and shaped stringers may be present. In an embodiment, to facilitate insulating these different stringers, a number of stringer insulation devices 12 may be produced with different sized and/or shaped noses 20. In another embodiment, variously sized and shaped adapters 16 may be produced to mate with each of the different stringers.

The taper 22 is configured to direct and/or compress a length of insulating material or "sock" 26 as the sock 26 is drawn therethrough. In various embodiments, the taper 22 may include any suitable conformation to facilitate directing and/or compressing the sock 26. For example, the taper 22 may include a frustoconical and/or faceted section that tapers from a relatively wide opening where the sock 26 is introduced, to a relatively narrow opening where the taper 22 transition into the nose 20. This transition may be relatively well defined as shown in FIG. 1, or may be gradual.

In various embodiments, the sock 26 is compressed before and/or during passage through the entry guide 18. In a particular example, the sock 26 is compressed at a ratio of about 3.5:1. This ratio is based on a number of factors. The factors include: type of insulation; "bounce-back" rate of the insulating sock; cross-sectional area of the stringer; empirical data; manufacturer's recommendations; and the like. As such, depending upon one or more of these factors, the sock 26 may be compressed at a relatively low compression ratio of about 1.5:1 to a relatively high compression ratio of about 7 or 10:1. In addition, for relatively short periods of time, the sock 26 may be compressed to a greater extent without harming the insulation material. For example, as the sock 26 passes through the entry guide 18, the sock 26 may be compressed for a temporary amount of time at a ratio of 10:1, 20:1, or more. In another example, the sock 26 may be compressed at a relatively high compression ratio by the supplier for shipment. In particular, the manufacturer or supplier may supply the sock 26 that is pre-wound on a supply reel at a compression ratio of, for example, 5:1, 8:1, 10:1, or the like. The insulating material included in the sock 26 may include any suitable acoustic, thermal, and/or vibration dampening material. Particular examples of suitable insulating materials include fiberglass and other spun fibers, foams, felts, aerogels, meshes, and the like.

The stringer insulation device 12 further an armature 28 and a supply reel 30. The armature 28 is configured to dispose the supply reel 30 in cooperative alignment with the entry guide 18. In various embodiments, the armature 28 may be essentially rigid or may be positionable by way of an adjustable articulation, for example. The supply reel 30 may be configured to retain and dispense a sufficient length of the sock 26 to span the length of the stringer 24. In this regard, depending upon the length and/or cross sectional area (e.g., the volume) of the stringer 24, the supply reel 30 may be sized accordingly. To dispense the sock 26, the supply reel 30 may be configured to rotate freely or with some slight resistance to facilitate drawing the sock 26 through the entry guide 18 and/or into the stringer 24.

The strap 14 includes a grasping end 32, a pulling end 34, and a body 36. The grasping end 32 is configured to secure the strap 14 to the sock 26. In various embodiments, the grasping end 32 may include any suitable device, fastener, adhesive, or the like, to detachably or permanently affix the strap 14 to the sock 26. In a particular example, the grasping end 32 includes a clamp configured to secure an end of the sock between two jaws and a locking ring to releasably lock the jaws in a closed position upon the end of the sock 26. The pulling end 34 is configured to facilitate drawing the strap 14 and/or the sock 26 through the entry guide 18 and/or the stringer 24. For example, the pulling end 34 may include a textured surface or handle to facilitate gripping and pulling on the pulling end 34. In another example, the pulling end 34 may include a fastener to facilitate fastening the pulling end 34 to a pulling device such as a powered spool, powered wench, or the like. The body 36 provides a strong and essentially inelastic connection between the pulling end 34 and the grasping end 32 to facilitate drawing the strap 14 and/or the sock 26 through the entry guide 18 and/or the stringer 24. More particularly, the body 36 reduces any tendency of the sock 26 to twist as it is pulled through the entry guide 18 and the stringer 24 by resisting torsional forces. In various embodiments, the body 36 may include any suitably strong material. Suitable materials may include natural, synthetic, or metal cording, braided cording, plaits, straps, ribbons, and/or the like. In a particular example, the body 36 includes metal strapping material to minimize any spin imparted upon the sock 26 as it is drawn through the stringer 24.

The adapter 16 is optionally included to facilitate securing the entry guide 18 to a different sized and/or shaped stringer. For example, the adapter 16 may be slid onto the nose 20 to adapt the stringer insulation device 12 for use with a larger stringer 38. To secure the adapter 16 to the entry guide 18, the adapter 16 may include a retaining clip 40. The retaining clip 40 is configured to materially deform as it is slid over the entry guide 18 and "snap" into place over a back edge of the entry guide 18. The optional adapter 16 may be removed by materially deforming the retaining clip to extend below the entry guide 18 and slid off the nose 20.

Figure 2:
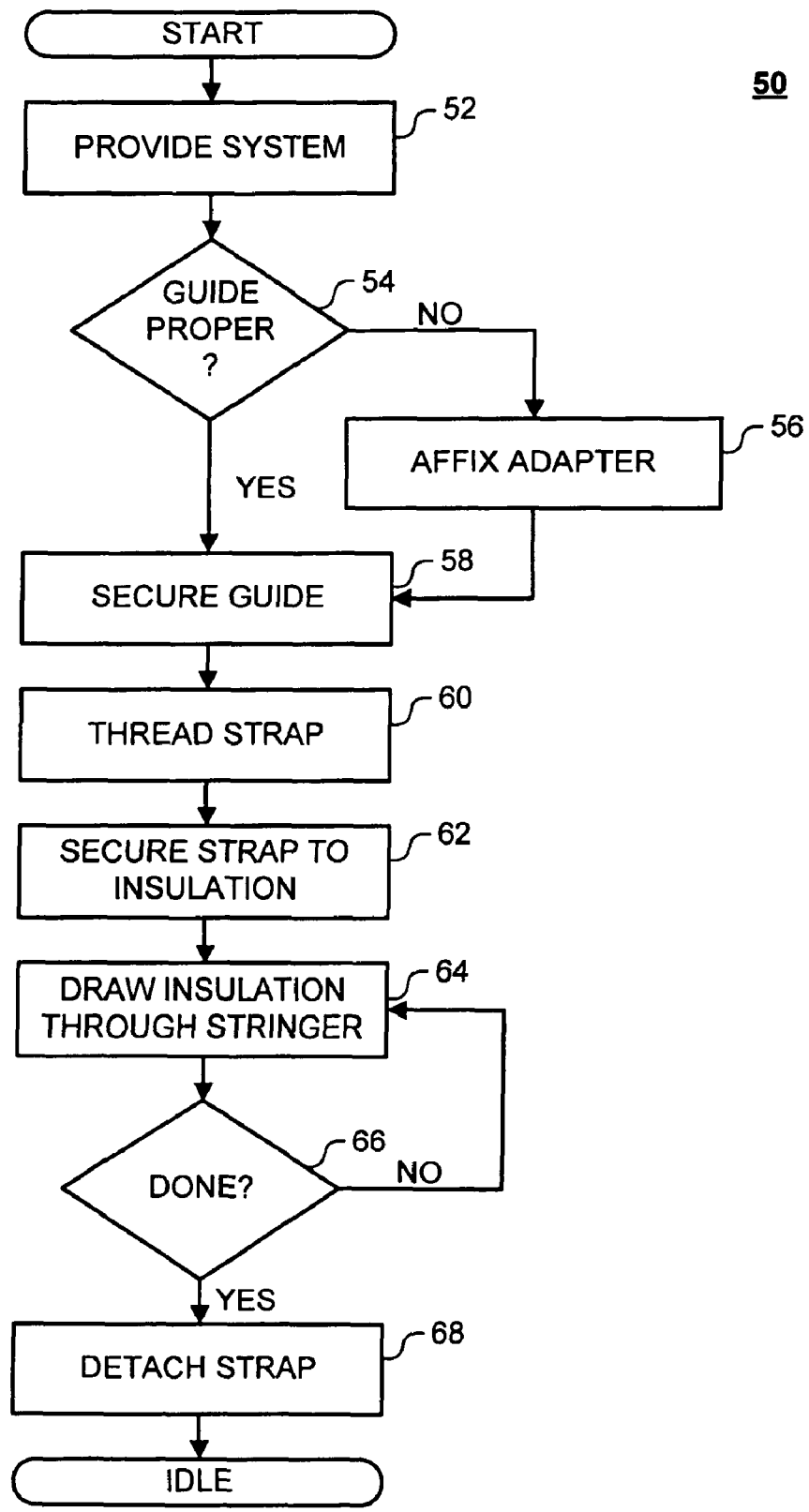
FIG. 2 is a flow diagram of a method used in the system of FIG. 1.

FIG. 2 is a flow diagram for a method 50 of installing insulation in aircraft stringer according to an embodiment of the invention. Prior to initiation of the method 50, a variety of preparation may occur. Examples of pre-installation preparation may include one or more of: generate and install the stringer 24 in an airplane fuselage; acquire insulation materials such as the sock 26; place the sock 26 on the supply reel 30; and the like. As shown in FIG. 2, the method 50 is initiated in response to providing a system such as the stringer insulation system 10.

At step 54, it is determined if the entry guide 18 is properly sized for the stringer 24. For example, if the nose 20 does not fit in the opening of the stringer 24 or the nose 20 fits excessively loosely in the opening of the stringer 24, it may be determined that the entry guide 18 is improperly sized for the stringer 24. In another example, if the nose 20 fits securely within the opening of the stringer 24, it may be determined that the entry guide is correctly sized. If it is determined that the entry guide is not correctly sized, the adapter 16 may be installed or removed at step 56. If it is determined that the entry guide is correctly sized, the guide may be secured within the stringer 24 at step 58.

At step 56, the adapter 16 may be installed or removed as indicated.

At step 58, the entry guide 18 may be secured to the stringer 24 by sliding the nose 20 into the stringer 24 a sufficient amount. For example, the nose 20 may be slid within the stringer 24 until about the transition between the nose 20 and the taper 22.

At step 60, the strap 14 may be threaded through the stringer 24. In various embodiments, the strap 14 may be threaded via either end of the stringer 24 until the strap 14 protrudes from the other end of the stringer 24. for example, the pulling end 34 may be threaded through the entry guide 18 and through the stringer 24 until the pulling end 34 protrudes from the distal end of the stringer 24. In another example, the grasping end 32 may be fed from the distal end of the stringer 24 until the grasping end 32 protrudes from the entry guide 18. In this or an alternative embodiment, the strap 14 may be threaded before the stringer insulation device 12 is secured to the stringer 24.

At step 62, the strap 14 is attached to the sock 26. For example, the grasping end 32 may be utilized to grasp or clamp an end of the sock 26. In another example, the grasping end 32 may be affixed to the end of the sock 26 via an adhesive such as an adhesive tape.

At step 64, the strap 14 may be drawn from the pulling end 34. For example, the pulling end 34 may be pulled by a user or mechanical pulling device. In this manner, the sock 26 may be compressed as it is drawn through the taper 22 and into the stringer 24.

At step 66, it may be determined if the stringer 24 has been insulated. For example, if is determined that the sock 26 protrudes from both ends of the stringer 24, then it may be determined that the sock 26 has been sufficiently drawn into the stringer 24. If the sock 26 is not protruding, the strap 14 may be further pulled at step 64. If it is determined that the sock 26 has been sufficiently drawn into the stringer 24, the strap 14 may be removed at step 68.

At step 68, the strap 14 may be removed from the sock 26. For example, the grasping end 32 may be operated to release the end of the sock 26. In another example, a portion of the sock 26 protruding from the stringer 24 may be severed.

Following the step 68, the stringer insulation device 12 may be removed from the stringer 24 and any excess length of the sock 26 may be removed. If sufficient length of the sock 26 remains on the supply reel 30, the stringer insulation device may be secured to an un-insulated stringer and the method 50 initiated again. Otherwise, if additional stringers remain to be insulated, the supply reel 30 may be replenished or replaced as appropriate.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of insulating an aircraft stringer, comprising the steps of:
    inserting an entry guide into the aircraft stringer, the entry guide having a taper;
    inserting a strap through the aircraft stringer;
    providing the insulating material on a supply reel wherein the insulating material is pre-wound on the supply reel at a compression ratio of between approximately 5:1 and 10:1;
    securing an end of the strap to a length of compressible insulating material on the supply reel;
    dispensing the length of insulating material from the supply reel;
    pulling the length of insulating material through the taper and into the aircraft stringer in response to pulling on the strap;
    compressing the insulating material via the taper prior to drawing the length of insulating material into the stringer.

2. The method according to claim 1, further comprising:
    disposing the supply reel proximal to the first end of the stringer.

3. The method according to claim 1,
    wherein:
    the entry guide is configured to secure the supply reel in cooperative alignment with the stringer.

4. The method according to claim 1, wherein the step of pulling the length of insulating material through the entry guide and into the stringer further comprises:
    resisting torsional forces on the length of insulating material to minimize twist imparted to the length of insulating material.

5. The method according to claim 1, further comprising:
    inserting a nose of the entry guide into an opening of the stringer.

6. The method according to claim 1, further comprising:
    inserting a nose of the entry guide into an adapter; and
    inserting the adapter into an opening of the stringer.

7. The method according to claim 1, further comprising:
    determining if the length of insulating material protrudes from ends of the aircraft stringer; and
    severing a portion of the insulating material protruding from the aircraft stringer.

8. The method according to claim 1, further comprising:
    removing the strap from the length of insulating material.

\* \* \* \* \*